Patented Dec. 5, 1939

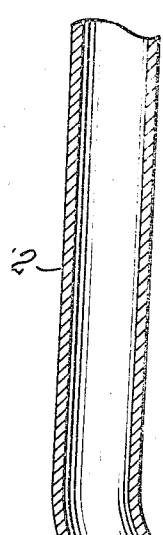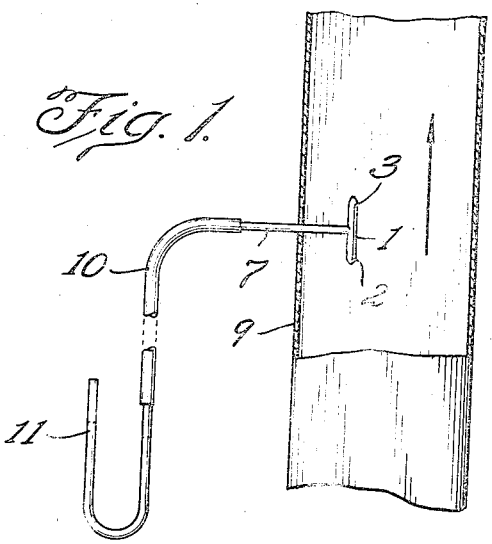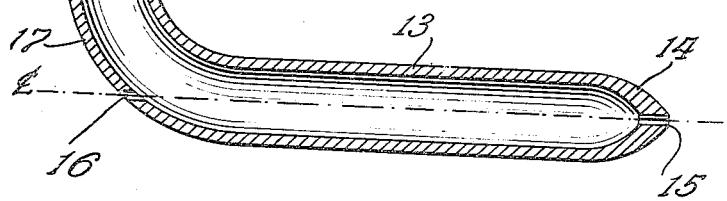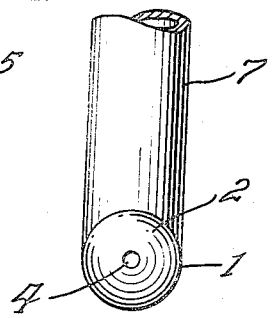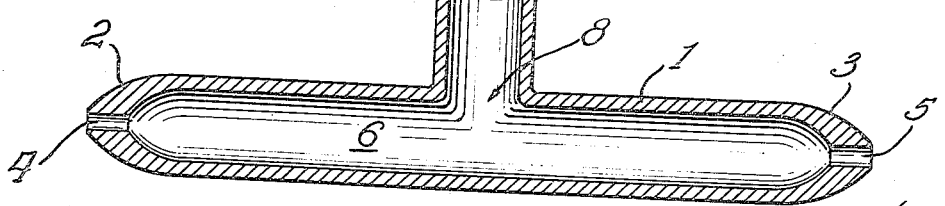

2,182,280

UNITED STATES PATENT OFFICE 2,182,280

STATIC PRESSURE MEASURING DEVICE

Alfred S. Chipley, Chicago, and Ralph L. Leadbetter, Wheaton, Ill., assignors, by mesne assignments, to Burgess Battery Company, Chicago, Ill., a corporation of Wisconsin Application May 18, 1938, Serial No. 208,516

7 Claims. (Cl. 73—31)

This invention relates to fluid pressure measuring devices and particularly to devices for measuring static pressures exerted by flowing fluids.

The object of this invention is to provide a device adapted to be attached to the end of a tube connected with a suitable static pressure registering instrument which device is designed to obviate the effect of the movement of the fluid whose static pressure is to be measured. Specific objects are to provide such a device which is simple and rugged in construction, which will admit of accurate measurement of static pressures of fluids moving at velocities covering a wide range, and which has flexibility of use and does not require strict accuracy in manufacture or use.

The device consists essentially of a hollow T-member having restricted openings in the extremities of the cross member or an L-member having restricted openings in the extremity of the base portion and in the heel portion and being open at the extremity of the stem member for attachment by a suitable conduit to the pressure registering device such as a manometer or draft gage.

In the drawing:

Fig. 1 illustrates the general arrangement of the device when in use;

Fig. 2 is an elevation, partly in section, of the device constructed in accordance with the invention;

Fig. 3 is a side view of the device of Fig. 2; and

Fig. 4 is a sectional elevation of a modified form of the device.

As will be seen from the drawing and the following detailed description, the measuring attachment is of very simple construction. The form of the device shown in Figs. 1-3 may conveniently be manufactured from copper tubing of, say ¼" diameter. Cross member 1 may be necked in or suitably plugged at its ends 2 and 3 to form restricted openings 4 and 5. Chamber 6 within the cross member may then be connected with stem 7 by soldering or otherwise sealing the end thereof to the wall of cross member 1 at opening 8 provided intermediate the ends thereof. Stem 7 is preferably connected with cross-member 1 at approximately its mid-point. Openings 4 and 5 should not be greater than 0.1" in diameter although larger openings may be used when the device is constructed from larger tubing. Openings having diameters of 0.02"–0.04" are preferred.

In use, the measuring device is inserted into the air stream whose pressure is to be measured with the cross member 1 aligned in the direction of flow of the fluid. The device is shown arranged in an air duct 9 in Fig. 1. The open end of stem 7 is connected by means of rubber tubing 10 to a suitable pressure registering instrument or manometer, such as U-tube 11. Since chamber 6 within the cross member 1 is in communication with the air in duct 9, pressure conditions in this chamber will be determined by the pressure conditions in the duct. A very small quantity of air enters opening in end 2 of the cross member, passes through chamber 6 and leaves the chamber via the opening in end 3 of the cross member. While the velocity of the air entering opening 4 may be substantially equal to the velocity of the air in the duct, this velocity will decrease to a negligible movement as the air passes opening 8 due to the greater cross sectional area of chamber 6 as compared with opening 4, this increased area permitting enlargement of the air stream entering opening 4. The effect of this air movement across the end of stem member 7 on the static pressure measurement is negligible.

While the above described construction accurately measures static pressure of air moving at velocities up to about 500 feet per minute and is accurate within 2–3% at even higher velocities, it has been found that error may be practically eliminated by providing an opening in the downstream end of the cross member of slightly greater diameter than the opening in the upstream end of this member. When the openings are equal, a slightly high reading is obtained due to the resistance to the flow of air from chamber 6 offered by the restricted opening providing egress for this air and consequent building up of a slight back pressure. The correct ratio of the diameters downstream opening to that of the upstream opening is 1.7, a permissible range of 1.6 to 1.8 giving results which are less than 0.1% in error at air velocities as high as 3,000 feet per minute.

Ends 2 and 3 of the cross member may be gently tapered or may be only slightly rounded or may even be entirely square. The tapered end is preferable, however, because the error introduced when the cross member is at an angle to the direction of flow of the air stream so that some of the air passes across the openings is less than that which would be caused by this cross motion of the air when square ends are used. Except when a square ended device is used, the cross-member may be as much as 10 degrees out of line with the direction of air flow without appreciable error being caused thereby. At an angle of 20 degrees the error has been found to be approximately 3%.

A modified form of measuring attachment is shown in Fig. 4. While the principle of operation of this particular device is the same as for the device above described, it has the additional advantage of being insertable into the air stream by means of a small opening in the wall of the duct or other structure through which the fluid moves. As shown, it is in the shape of an L having stem portion 12 and base portion 13, the free extremity 14 of the latter being provided with a small opening 15. A second small opening 16 is provided in heel portion 17 of the device. Openings 15 and 16 should be substantially axially aligned. This device should be arranged with free end 14 upstream and opening 16 should preferably be somewhat larger than opening 15. Stem 12 may be connected with a suitable pressure registering instrument.

Suitable dimensions for the device of Fig. 4 are as follows: Base portion 13 may be approximately 8 times the inside diameter of the tube from which the device is constructed, if a circular tube is used, or its equivalent if structural materials having a cross-section other than circular are used. The radius of curvature of the device at the heel or vertex may be about 1½ times this diameter. These dimensions are not critical. Opening 15 may be 0.04" and opening 16 may be 0.052" in diameter.

It will readily be seen that this invention used in conjunction with a sample Pitot tube may be used wherever the more complicated Pitot-static tubes and kindred devices have heretofore been employed. It may be used for measuring barometric pressure in an airplane while it is in flight. For obvious reasons, the devices having unequal openings must be reversed when measuring a vacuum, that is, the larger opening should be upstream.

We claim:

1. A device useful in measuring static pressure of a flowing fluid comprising a hollow elongated member disposed in alignment with the direction of flow of the fluid and having openings in the extremities thereof of small cross-sectional area as compared with the inside cross-sectional area of said hollow member, and means for connecting the interior of said hollow member with a pressure registering instrument.

2. A device useful in measuring static pressure of a flowing fluid comprising a hollow elongated member having tapered ends, said member being disposed within 10° of alignment with the direction of flow of the fluid and having openings in the ends thereof of small cross-sectional area as compared with the inside cross-sectional area of said hollow member, and means for connecting the interior of said hollow member with a pressure registering instrument.

3. A device used in the measurement of static pressure of a flowing fluid comprising a hollow T-member having openings in the ends of the cross member thereof, said openings having small cross-sectional areas as compared with the inside cross-sectional area of said cross member, the free end of the stem of said T-member being open, and means for connecting said stem with a pressure registering instrument.

4. A device useful in measuring static pressure of a flowing fluid comprising a hollow elongated member disposed in alignment with the direction of flow of the fluid and having openings in the ends thereof of small cross-sectional area as compared with the inside cross-sectional area of said hollow member, said opening in the downstream extremity of said member being larger than said opening in the upstream extremity of said member, and means for connecting the interior of said hollow member with a pressure registering instrument.

5. A device in accordance with claim 4 in which said opening in the downstream end of said member is 1.6 to 1.8 times as large in diameter as said opening in the upstream extremity of said member.

6. A device in accordance with claim 4 in which the diameter of said opening in the downstream extremity of said member is 1.7 times the diameter of said opening in the upstream extremity of said member.

7. A device useful in the measurement of static pressure of a flowing fluid comprising a hollow L-shaped member having a base portion and a stem portion, an opening in the free end of said base portion and an opening in the heel of said base portion in substantially axial alignment with said first-mentioned opening, said openings being of small area as compared with the cross-sectional area of the inside of said base portion, said stem being adapted to be connected with a pressure registering instrument.

ALFRED S. CHIPLEY.
RALPH L. LEADBETTER.